US006829692B2

(12) United States Patent
Schmisseur et al.

(10) Patent No.: US 6,829,692 B2
(45) Date of Patent: Dec. 7, 2004

(54) SYSTEM AND METHOD FOR PROVIDING DATA TO MULTI-FUNCTION MEMORY

(75) Inventors: Mark A. Schmisseur, Phoenix, AZ (US); Jeff McCoskey, Phoenix, AZ (US); Timothy J. Jehl, Higley, AZ (US)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 09/953,752

(22) Filed: Sep. 14, 2001

(65) Prior Publication Data

US 2003/0056072 A1 Mar. 20, 2003

(51) Int. Cl.[7] .............. G06F 12/00

(52) U.S. Cl. .............. 711/173; 711/100; 711/147; 711/153; 711/158; 711/125

(58) Field of Search .............. 711/147, 149, 711/129, 100, 107, 118, 121, 125, 153, 170, 171–173; 712/10, 22; 345/542, 539; 710/22, 27, 28

(56) References Cited

U.S. PATENT DOCUMENTS

| | | | | |
|---|---|---|---|---|
| 4,674,089 A | | 6/1987 | Poret et al. | |
| 5,454,107 A | | 9/1995 | Lehman et al. | |
| 5,596,734 A | * | 1/1997 | Ferra | 710/5 |
| 5,712,664 A | | 1/1998 | Reddy | |
| 5,761,727 A | * | 6/1998 | Wu et al. | 711/147 |
| 5,828,825 A | * | 10/1998 | Eskandari et al. | 714/27 |
| 5,835,784 A | | 11/1998 | Gillespie et al. | 395/830 |
| 5,854,638 A | * | 12/1998 | Tung | 345/542 |
| 5,966,734 A | | 10/1999 | Mohamed et al. | |
| 6,041,400 A | * | 3/2000 | Ozcelik et al. | 712/35 |
| 6,131,140 A | | 10/2000 | Rodgers et al. | |
| 6,131,174 A | | 10/2000 | Fischer et al. | |
| 6,226,738 B1 | * | 5/2001 | Dowling | 712/225 |
| 6,415,393 B2 | * | 7/2002 | Satoh | 714/30 |
| 6,594,711 B1 | * | 7/2003 | Anderson et al. | 710/22 |

OTHER PUBLICATIONS

Intel 80303 I/O Processor Deceloper's Manual, Jun. 2000, Chapters 1–4.

* cited by examiner

*Primary Examiner*—Matthew Kim
*Assistant Examiner*—Zhuo H. Li
(74) *Attorney, Agent, or Firm*—Blakely, Sokoloff, Taylor & Zafman LLP

(57) ABSTRACT

Disclosed are a system and method of transmitting data or instructions through a data bus to a memory array associated with a core processing circuit. The memory array may be initially adapted to receive data from the data bus and store the data or instructions received from the data bus. At least a portion of the memory array comprising the stored data or instructions may then be configured as a cache memory of the core processing circuit.

21 Claims, 3 Drawing Sheets

SDRAM 14; 22; SHARED MEMORY 28; CACHE 26; 4; MEMORY CONTROLLER 30; CORE PROCESSOR 2; MEMORY CONTROLLER 6; APPLICATION ACCELERATOR 8; 24; PRIMARY ATU 13; DMA 12; SECONDARY DMA 10; 18; BRIDGE 16; SECONDARY BUS 20

SYSTEM AND METHOD FOR PROVIDING DATA TO MULTI-FUNCTION MEMORY

BACKGROUND

1. Field

Disclosure provided herein relates to processing circuitry. In particular, embodiments provided herein relate to the use of memory arrays.

2. Information

Embedded processing systems typically comprise a core processing circuit which executes instructions stored in a memory. To commence execution from a reset state, the core processing circuit may initially attempt to fetch instructions for execution from an associated cache memory. If no such instructions are to be found in the cache memory, the core processing circuit may attempt to retrieve instructions from another memory through a data bus. The retrieved instructions may then be loaded to the cache memory and then fetched for execution.

While initial instructions for execution by a core processing system may be retrieved from an external memory, providing such an external memory in an embedded processing system may be costly and/or sacrifice performance in the execution of applications. Accordingly, there is a need to provide systems and methods of providing instructions to a cache memory in an embedded processing system for subsequent execution by a core processing circuit.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
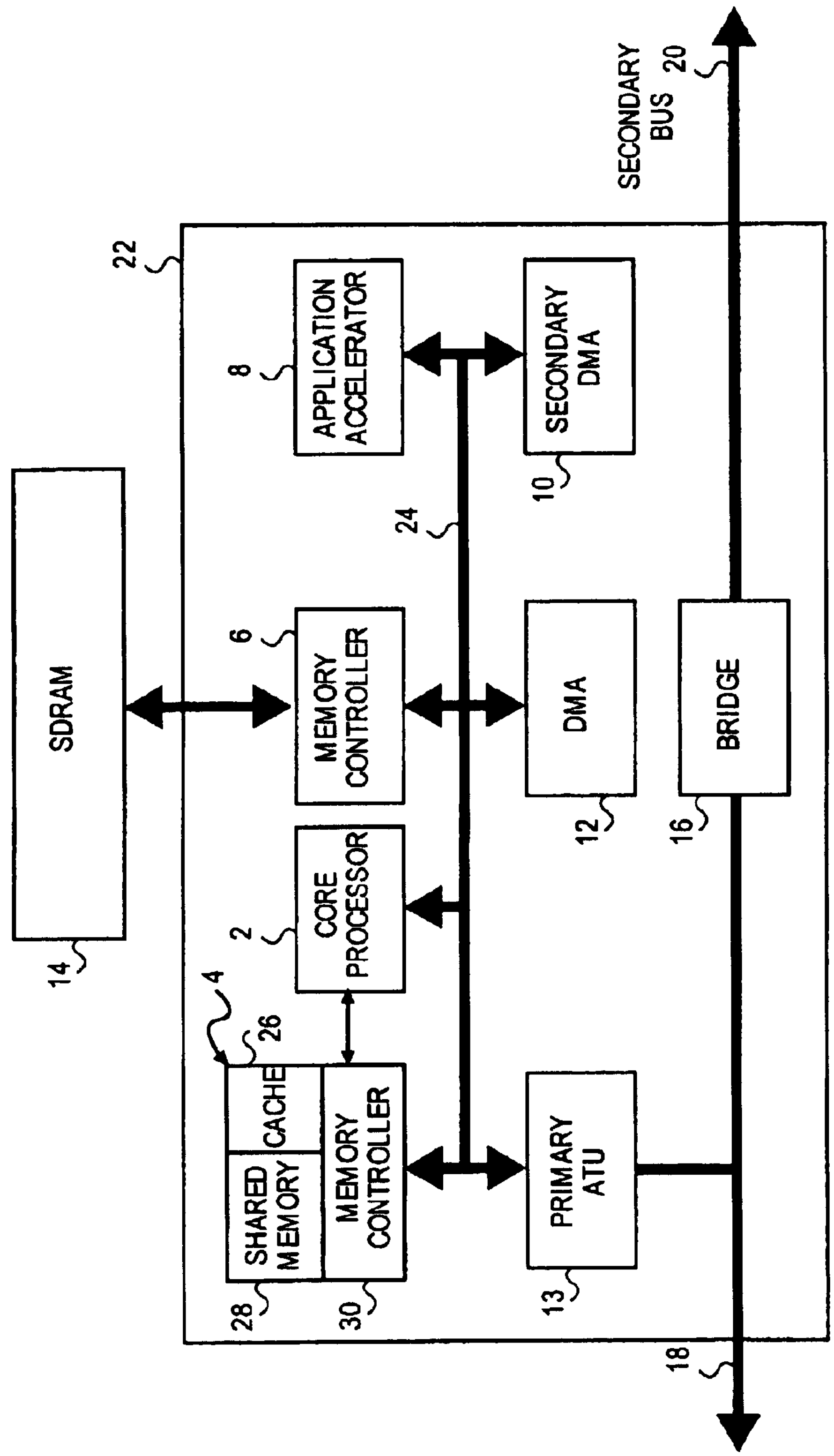
FIG. 1 shows a schematic diagram of a processing system according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and embodiments of the present invention are not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and embodiments of the present invention are not limited in this respect.

"Storage medium" as referred to herein relates to media capable of maintaining expressions which are perceivable by one or more machines. For example, a storage medium may comprise one or more storage devices for storing machine-readable instructions. Such storage devices may comprise any one of several media types including, for example, magnetic, optical or semiconductor storage media. However, these are merely examples of a storage medium and embodiments of the present invention are not limited in these respects.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise processing circuitry in combination with machine-executable instructions stored in a storage medium. However, these are merely examples of structures which may provide logic and embodiments of the present invention are not limited in this respect.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and a peripheral device and embodiments of the present invention are not limited in this respect.

A "data bus" as referred to herein relates to circuitry for transmitting data between devices. For example, a data bus may transmit data between a host processing system and a peripheral device. Also, a data bus internal to an embedded processing structure (which may be coupled to an external bus structure in a processing platform) may transmit data among devices formed in the embedded processing structure. However, these are merely examples of a data bus and embodiments of the present invention are not limited in these respects. A "bus transaction" as referred to herein relates to an interaction between devices coupled in a bus structure wherein one device transmits data addressed to the other device through the bus structure.

A "shared memory" as referred to herein relates to a portion of memory which is accessible by more than one device. A shared memory may be accessible by multiple processing systems or devices in a processing platform. For example, a processing system may store data in a shared memory which is to be processed by device having access to the shared memory. In another example, a shared memory may be formed in an embedded processing structure such that portions of the memory are accessible by more than one device coupled to an internal data bus. However, these are merely examples of a shared memory and embodiments of the present invention are not limited in these respects.

A data bus may transfer data between devices or bus agents in a processing platform using a "direct memory access" (DMA) transaction through which data may be transferred in the data bus independently of one or more processes hosted on a processing system. For example, a device coupled to a data bus structure may act as a bus master to initiate bus transactions to store or retrieve data in memory. However, these are merely examples of DMA systems and DMA transactions, and embodiments of the present invention are not limited in these respects.

A "memory array" as referred to herein relates to one or more devices in which data may be stored in or retrieved from physically addressable memory locations. Such physically addressable locations may comprise consecutively addressable data words having the capacity to store a uniform number of data bits. A memory array may be formed in any one of several mediums such as, for example, semiconductor, optical or magnetic media. However, these are merely examples of a memory array and embodiments of the present invention are not limited in these respects.

A "core processing circuit" as referred to herein relates to logic formed in a device which is capable of executing logical instructions. A core processing circuit may execute logical instructions defining data as inputs to the instructions. In one example of a core processing circuit, the core processing circuit may execute logical instructions stored in a memory array. In another example, a core processing circuit may comprise more than one synchronized processing elements which execute logical instructions stored in a common memory array or distinct memory arrays. However, these are merely examples of a core processing circuit and embodiments of the present invention are not limited in these respects.

A "reset state" as referred to herein relates to a state of a core processing circuit in which the execution of instructions is suspended. Upon "release" from a reset state, a core processing circuit may commence executing instruction from a predetermined location in a storage medium. Also, a release from a reset state may result in a re-initialization of an internal state or sequential elements of a core processing circuit to a known state prior to commencement of execution. However, these are merely examples of a reset state and a release from a reset state, and embodiments of the present invention are not limited in these respects.

Logic in a core processing circuit may store data in or retrieve data from a "system memory" comprising a memory array coupled to the core processing circuit through a data bus. Such logic in a core processing circuit may also store data in or retrieve data from a "cache memory" which may provide faster storage or retrieval of data than storage or retrieval of data in a system memory. For example, logic at the core processing circuit may access the cache memory independently of a data bus which may reduce any latency associated with the storage or retrieval of data. However, these are merely examples of a cache memory and embodiments of the present invention are not limited in these respects.

"Configure" as referred to herein relates to a process or procedure to alter, change or set a resource to behave in a manner consistent with a resource configuration. For example, portions of a memory array may be configured to behave as a cache memory or a shared memory which is accessible by one or more devices coupled to a data bus. However, this is merely an example of how a resource may be configured and embodiments of the present invention are not limited in this respect.

A "data transmission device" as referred to herein relates to devices comprising logic to transmit data messages. For example, a data transmission device may transmit data messages in a data bus by initiating bus transactions. However, this is merely an example of a data transmission device and embodiments of the present invention are not limited in this respect.

Briefly, an embodiment of the present invention relates to a system and method of transmitting data or instructions through a data bus to a memory array associated with a core processing circuit. The memory array may be initially adapted to receive data from the data bus and store the data or instructions received from the data bus. At least a portion of the memory array comprising the stored data or instructions may then be configured as a cache memory of the core processing circuit. However, this is merely an example embodiment and other embodiments of the present invention are limited in this respect.

FIG. 1 shows a schematic diagram of a processing system according to an embodiment of the present invention. A device 22 is coupled to external data busses 18 and 20 which are coupled at a bridge 16. In the illustrated embodiment, the data bus 18 is coupled to a host processing system (not shown) such that the bridge 16 defines the data bus 18 as a primary bus and defines the data bus 20 as a secondary bus. The data busses 18 and 20 may be formed according to any one of several industry standard bus architectures including, for example, the Peripheral Components Interconnect (PCI) data bus as provided in the PCI Local Bus Specification Rev. 2.2, the PCI-X data bus as provided in the PCI-X Specification Rev. 1.0a, other versions of PCI (e.g., 3GIO), Fibrechannel, Serial ATA, Ethernet, EISA or ISA. However, these are merely examples of a bus structure which may be coupled to a processing system and embodiments of the present invention are not limited in these respects.

In an embodiment in which the data busses 18 and 20 comprise a PCI bus, the bridge 16 may comprise a PCI-to-PCI bridge formed according to the PCI-to-PCI Bridge Architecture Specification, Rev. 1.1, Dec. 18, 1998 (hereinafter "PCI-to-PCI Bridge Specification"). However, embodiments of the present invention are not limited in this respect and a bus, bridge or bus configuration according to other embodiments may be employed using other techniques.

The device 22 comprises an internal data bus 24 coupled to a plurality of data transmission devices including a memory controller 6, application accelerator 8, memory controller 30 secondary DMA channel 10 to initiate DMA transactions on the internal bus 24, DMA channel 12 to initiate DMA transactions on the secondary bus 20, memory array 4 and core processing circuit 2. The device 22 may be formed in a single semiconductor die. However, this is merely an example of an implementation of an embedded processing structure and embodiments of the present invention are not limited in this respect.

The memory controller 6 may be coupled to an external memory array 14 through an interface with the device 22. Also, the external memory array 14 may be any one of several types of memory arrays including a synchronous dynamic random access memory (SDRAM) array. However, these are merely examples of how an external memory device may be coupled to an internal bus and embodiments of the present invention are not limited in this respect.

The data transmission devices coupled to the internal data bus 24 may store data in or retrieve data from the external memory array 14 through the memory controller 6. However, devices on the internal bus may also store data in or retrieve data with a reduced latency from a portion of the memory array 4 formed as part of the device 22. For example, a higher latency external memory array 14 may be suitable for longer burst data transfers such as transfers initiated by the DMA circuit 12 or secondary DMA circuit 10 while the lower latency portion of the memory array 4 may be suited for shorter burst transfers of data within elements of the device 22.

According to an embodiment, the core processing circuit 2 may comprise any one of several processing architectures including that of the StrongARM®, XScale® or i960® core processors which are implemented in products sold by Intel Corporation. However, these are merely examples of processing architectures which may be implemented in a core processing circuit and other processing architectures may be used. In the illustrated embodiment, the core processing circuit 2 may execute logical instructions retrieved from a physical memory. The execution of such logical instructions may cause processing of input data which is also retrieved from a storage medium such as the external memory 14 or portions of the memory array 4.

In the illustrated embodiment, the core processing circuit 2 may be adapted to access one or more levels of cache memory. Such access to a cache memory may incur shorter latencies than latencies incurred with accessing data stored in a storage medium such as the external memory 14. According to an embodiment, the core processing circuit 2 may fetch data and instructions from one or more levels of cache memory configured in the memory array 4.

According to an embodiment, the memory array 4 may comprise one or more SRAM devices having addressable memory locations. In the illustrated embodiment, the single memory array 4 may be configured to provide a shared portion 28, and a cache memory portion 26 accessible by the core processing circuit 2. Each portion of 26 and 28 of the memory array 4 may be addressable through a memory controller 30. The cache memory portion 26 may be configured to function as a secondary cache (e.g., L2 or higher) of a primary cache (e.g., L1) of the core processing circuit 2. While the shared portion 28 may be accessible to the data transmission devices coupled to the internal bus 24 independently of the core processing circuit 2, in the presently illustrated embodiment the memory controller 30 may control access to the cache portion 26 from the core processing circuit 2 (independently of the internal data bus 24). Accordingly, the memory controller 30 may configure the single memory array 4 to provide a cache memory for the core processing circuit 2 and a shared memory for the data transmission circuits coupled to the internal bus 24.

In the embodiment illustrated with reference to FIG. 1, the memory controller 30 and core processing circuit 2 each comprise an independent interface with the internal bus 24. Thus, the memory controller 30 and core processing circuit 2 may each have different device addresses on the internal bus 24 such that data may be written to or read from the memory array 4 through a bus transactions addressed to the device address of the memory controller 30. In this manner, data may be written to or retrieved from the memory array 4 independently of the core processing circuit 2. In an alternative embodiment, the core processing circuit 2 and memory controller 30 may share a common interface with the internal bus 24 such that bus commands to either the memory controller 30 or core processing circuit 2 may be addressed to a common device address. For example, the device interface may define separate device functions corresponding with the memory controller 30 and core processing circuit 2 such that bus transactions on the internal bus 24 may address either device through a common device address. However, this is merely an example of how bus transactions may be addressed to a memory controller or a core processing circuit through a common device interface on a bus, and embodiments of the present invention are not limited in this resect. Also, these are merely examples of how a memory array may be accessible through a data bus independently of a core processing circuit and embodiments of the present invention are not limited in this respect.

According to an embodiment, the memory array 4 comprises a plurality of addressable memory locations into which data may be stored and then retrieved in response to "read" or "write" commands addressed to the memory controller 30. Such addressable memory locations may store data words of a uniform bit length. The read or write commands may be initiated by the core processing circuit 2 using cache commands. Also, the read or write commands may be initiated by devices on the internal data bus 24 for accessing the shared portion 28 by writing to bus registers of the memory controller 30. However, these are merely examples of how a memory controller may be used to configure a single memory array to have separately addressable memory locations and embodiments of the present invention are not limited in these respects.

The memory array 4 may be selectively configured to allocate a portion of the addressable memory locations to the cache memory portion 26 and the shared portion 28. In other embodiments, addressable memory locations may be statically allocated to the cache memory portion 26 and the shared portion 28 when the device 22 is formed. In another embodiment, the memory controller 30 may dynamically allocate addressable memory locations to the cache memory portion 26 and shared memory portion 28 in response to data provided to configuration registers accessible through the internal data bus 24. However, these are merely examples of how a memory array may be configured to provide a cache for a processing circuit and a shared memory accessible by devices through a data bus, and embodiments of the present invention are not limited in this respect.

According to an embodiment of the present invention, the memory array 4 may have multiple modes of operation. In a first mode, the memory array 4 may be in a shared state such that at least a selected portion is a shared memory which is accessible by devices on the internal data bus 24. In a second mode or "cache mode," the selected portion of the memory array 4 may comprise a cache portion for the core processing circuit 2. Accordingly, data or instructions may be stored in the selected portion from the internal data bus 24 in the first mode. Following a transition to the second mode, the selected portion provides a cache memory (e.g., cache portion 26) such that the data or instructions stored in the first mode are retrievable by the core processing circuit 2 through the memory controller 30 independently of the internal data bus 24 using cache operations.

According to an embodiment, the memory controller 30 may configure the memory array 4 to be in either the first mode or the second mode in response to configuration registers associated with the memory controller 30 that are addressable on the internal data bus 24. In addition to determining a mode of operation for the memory controller 30, the configuration registers may also define address ranges for selected portions of the memory array 4 (e.g., cache portion 26 and shared portion 28). However, this is merely an example of how a memory controller may receive a control signal or data to determine a mode of operation for an associated memory array and embodiments of the present invention are not limited in these respects.

Figure 2:
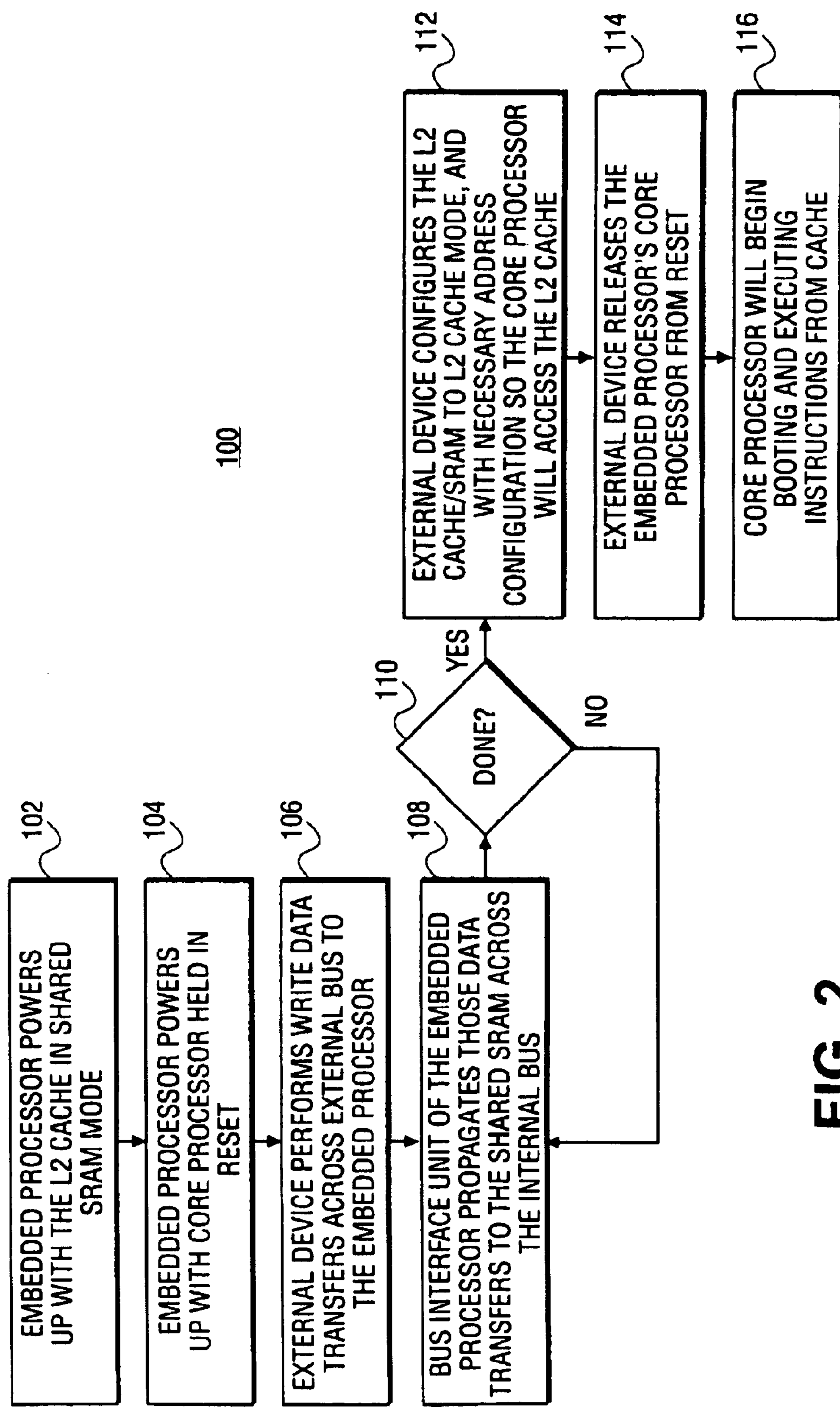
FIG. 2 shows a flow diagram illustrating a process of loading data or instructions to a cache memory according to an embodiment of the processing system of FIG. 1.
Figure 3:
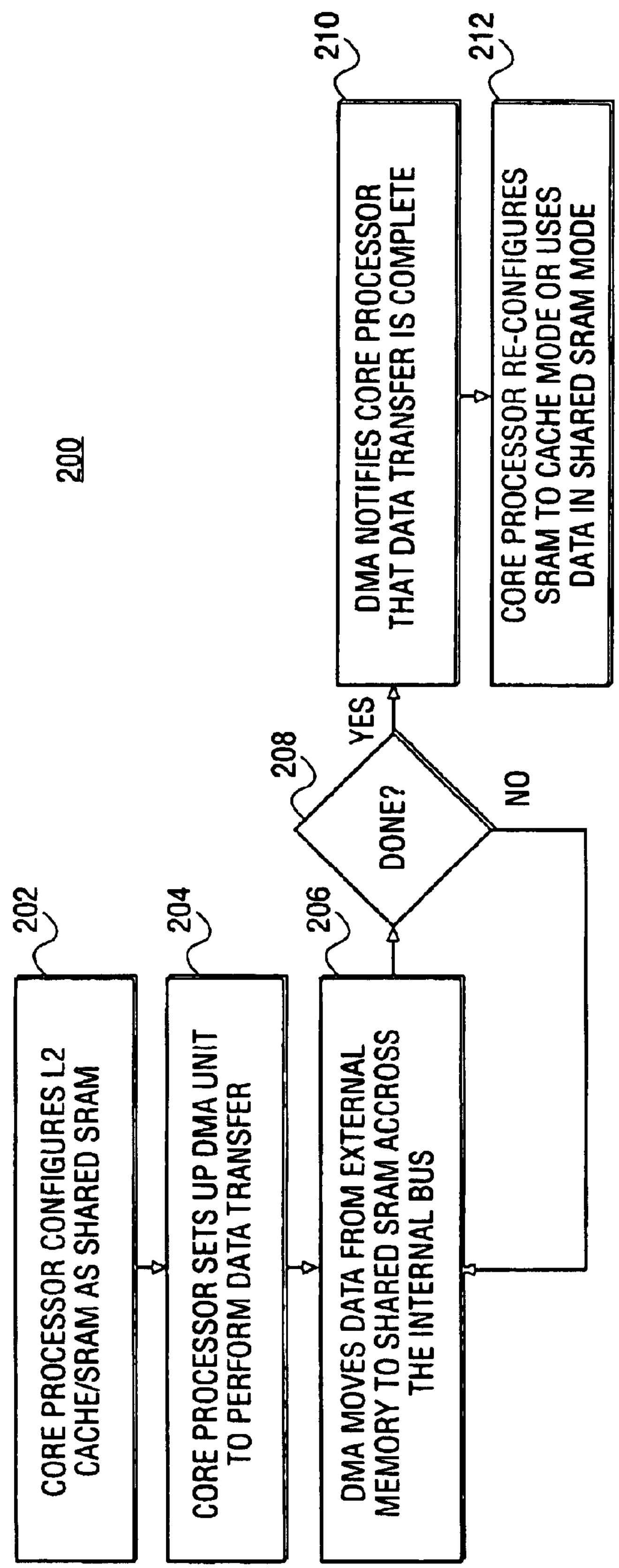
FIG. 3 shows a flow diagram illustrating a process of loading data or instructions to a cache memory according to an alternative embodiment of the processing system of FIG. 1.

FIGS. 2 and 3 relate to systems and methods for storing data or instructions in a cache memory of a core processing circuit according to embodiments of the present invention. When the cache memory has been stored with data or instructions, the core processing circuit may then retrieve the loaded data or instructions and commence execution. However, this is merely an embodiment of the present invention and other embodiments are not limited in this respect.

FIG. 2 shows a flow diagram illustrating a process 100 of storing data or instructions to a cache memory according to an embodiment of the processing system of FIG. 1. In the presently illustrated embodiment, the memory array 4 may be in a shared mode such that an external device coupled to either the primary data bus 18 or secondary data bus 20 may transmit data to the device 22 to be stored in the cache portion 26. At block 102, the core processing circuit 2 is powered up with the memory array 4 in the shared mode such that data may be written to the cache portion 26 from the internal data bus 24. According to an embodiment, the external device may place the memory array 4 in a shared mode by writing to configuration registers on the internal bus 24 associated with the memory controller 30 as discussed above. At block 104, the core processing circuit 2 may be placed in a reset state such that the core processing circuit 2 is suspended from executing instructions.

In the illustrated embodiment, the external device transmitting data to the device 22 may provide a control signal to maintain the core processing circuit 2 in the reset state. In an embodiment in which the core processing circuit 2 comprises an XScale® processing core implemented in products sold by Intel Corporation, for example, the external device may initiate a bus transaction to provide data in a register associated with the core processing circuit 2 which is addressable through the internal data bus 24. In other embodiments, the external device may assert a signal on a pin (not shown) of the device 22 to maintain the core processing circuit 2 in the reset state. However, these are merely examples of how a core processing system may be maintained in a reset state and embodiments of the present invention are not limited in these respects.

At block 106, the external device may initiate a bus transaction on either the primary data bus 18 or the secondary data bus 20 to transmit data or instructions to the device 22. For example, the external device may comprise a host processing system (not shown) coupled to the primary data bus 18 with logic to load initial data or instructions to be executed by the core processing circuit 2. The external device may initiate a series of "write" bus commands addressed to locations in the memory array 4 to fill portions of the memory array with the data or instructions. A bus interface such as the primary address translation unit (ATU) 13 may then transmit the data or instructions received from the primary data bus 18 through the internal data bus 24 to the memory array 4 at block 108. Following the write bus commands, the external device may initiate a "read" bus command to the last address in the memory array 4. Because of forced ordering of the bus commands issued by the external device, the external device may then detect when filling of the memory array 4 is complete at diamond 110 upon receipt of a response to the read bus command. Alternatively, the device 22 may provide a signal (e.g., on an external pin interface) to assert on the completion of each pending bus transaction to indicate to the external device when loading to the memory array 4 is complete. However, these are merely examples of how an external device may detect when the loading of instructions or data to a memory array is complete, and embodiments of the present invention are not limited in this respect.

Upon detecting completion of the loading of data or instructions to the memory array 4, the external device may initiate a transition of the memory array 4 from the shared mode to the cache mode (such that the cache portion 26 provides a cache for the core processing circuit 2) at block 112 by, for example, initiating a bus transaction to provide data to configuration registers associated with the memory controller 30 which are accessible through the internal data bus 24. However, this is merely an example of how an external device may initiate a transition between modes of a memory array and embodiments of the present invention are not limited in this respect. The external device may then release the core processing circuit 2 from the reset state at block 114 by, for example, initiating a bus transaction to provide data to a register associated with the core processing circuit 2 which is accessible through the internal data bus 24 or de-asserting a voltage on a pin (not shown) on the device 22. However, these are merely examples of how an external device may release a core processing circuit from a reset state and embodiments of the present invention are not limited in these respects. Upon release from the reset state, the core processing circuit 2 may commence execution by fetching instructions stored in the cache memory portion 26 while the memory array 4 was in the shared mode.

FIG. 3 shows a flow diagram illustrating a process 200 of storing data or instructions to a cache memory according to an alternative embodiment of the processing system of FIG. 1. In this embodiment, the process 200 is controlled by executing machine-readable instructions in the core processing circuit 2 to define portions of the memory array 4 independently of processes external to the core processing circuit 2. At block 202, the core processing circuit 2 may be powered and cause the memory array 4 to be configured in the shared mode such that data may be written to the cache portion 26 through the internal data bus 24 independently of the core processing circuit 2. The core processing circuit 2 may then execute instructions (e.g., instructions in external memory or cache internal to the core processing circuit 2) commanding the DMA circuit 12 to initiate a DMA transaction to store instructions or data in the cache portion 26 at block 204. In response, the DMA circuit 12 may initiate a DMA transaction on the internal data bus 24 to transfer data or instructions to the cache portion 26 at block 206. However, this is merely an example of how a DMA transaction may be used to transfer data or instructions to a memory array accessible by a data bus and embodiments of the present invention are not limited in this respect.

The core processing circuit 2 may detect that the DMA transaction is complete by, for example, receiving an interrupt signal from the DMA circuit 12 or polling registers in the DMA circuit. Upon detecting that the DMA transaction is complete (and that the data or instructions have been loaded to the cache portion 26) at diamond 208, the core processing circuit 2 may then cause a re-configuration of the memory array 4 to be in the cache mode (by, for example, initiating a bus transaction on the internal data bus 24 to write data to a configuration register associated with the memory controller 30) such that the cache portion 26 provides a cache memory to the core processing circuit 2 to store the data or instructions transferred from the DMA transaction. However, this is merely an example of how a core processing circuit may cause a memory array to be configured to act as a cache memory for the core processing circuit and embodiments of the present invention are not limited in this respect. The core processing circuit 2 may then fetch data or instructions stored in the cache portion 26 independently of the internal data bus 24.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:

a data bus;

a core processing circuit;

a memory array;

logic to store instructions transmitted on the data bus to a cache portion of the memory array while the core processing circuit is in a reset state;

logic to initiate a release of the core processing circuit from the reset state upon completion of storing the data or instructions to the cache portion; and logic to access the stored instructions in the cache portion in response to the core processing circuit independently of the data bus.

2. The apparatus of claim 1, wherein the apparatus further comprises logic to configure a first portion of the memory array as a portion comprising the cache portions and a second portion of the memory array as a memory accessible by devices coupled to the data bus.

3. The apparatus of claim 2, wherein the apparatus further comprises logic to configure the cache portion to be accessible by the core processing circuit independently of the data bus in response to receipt of data on a configuration register.

4. The apparatus of claim 1, wherein the apparatus further comprises logic to initiate a DMA transaction to load at least one of data and instructions to the cache portion from the data bus.

5. The apparatus of claim 1, wherein the core processing circuit further comprises logic to initiate execution of instructions stored in the cache portion upon release of the core processing circuit from the reset state.

6. A method comprising:

configuring a memory array to receive data from a data bus;

transmitting instructions through the data bus to the memory array;

storing the transmitted instructions in a cache portion of the memory array while maintaining a core processing circuit in a reset state;

configuring the cache a portion of the memory array to be accessible by the core processing circuit independently of the data bus; and releasing the core processing circuit from the reset state upon configuring the cache portion to be accessible by the core processing circuit independently of the data bus.

7. The method of claim 6, wherein the method further comprises initiating a DMA transaction on the data bus to transmit the instructions from a storage medium to the memory array.

8. The method of claim 6, wherein the method further comprises initiating execution of instructions stored in the cache portion by the core processing circuit upon release of the core processing circuit from the reset state.

9. The method of claim 6, wherein the method further comprises configuring a shared portion of the memory array to be accessible though the data bus independently of the core processing circuit.

10. A system comprising:

an external data bus;

a first device comprising logic to provide instructions for transmission through the external data bus; and a second device coupled to the external data bus comprising:

an internal data bus;

a core processing circuit;

a memory array;

logic to receive the instructions from the first device on the external data bus;

logic to store instructions received on the internal data bus to a cache portion of the memory array while the core processing circuit is in a reset state;

logic to access the stored instructions in the cache portion in response to the core processing circuit independently of the internal data bus; and logic to initiate a release of the core processing circuit from the reset state upon completion of storing the instructions to the cache portion.

11. The system of claim 10, wherein the second device further comprises logic to configure a first portion of the memory array as a portion comprising the cache portion and a second portion of the memory array as a memory accessible by devices coupled to the internal data bus.

12. The system of claim 11, wherein the second device further comprises logic to configure the cache portion to be accessible by the core processing circuit independently of the internal data bus in response to receipt of data on a configuration register.

13. The system of claim 10, wherein the second device further comprises logic to initiate a DMA transaction to load instructions to the cache portion from the first device.

14. The system of claim 10, wherein the second device comprises a register accessible through the internal data and the first device comprises logic to initiate a bus transaction to write data to the register to maintain the core processing circuit in the reset state.

15. The system of claim 10, wherein the second device comprises a register accessible through the internal data and the first device comprises logic to initiate a bus transaction to write data to the register to release the core processing circuit from the reset state.

16. The system of claim 10, wherein the core processing circuit further comprises logic to initiate execution of instructions stored in the cache portion upon release of the core processing circuit from the reset state.

17. An apparatus comprising:

means for configuring a memory array to receive data from a data bus;

means for transmitting instructions through the data bus to the memory array;

means for storing the transmitted instructions in a cache portion of the memory array while maintaining a core processing circuit in a reset state;

means for configuring the cache a portion of the memory array to be accessible by the core processing circuit independently of the data bus; and means for releasing the core processing circuit from the reset state upon configuring the cache portion to be accessible the core processing circuit independently of the data bus.

18. The apparatus of claim 17, wherein the apparatus further comprises means for initiating a DMA transaction on the data bus to transmit the data or instructions from a storage medium to the memory array.

19. The apparatus of claim 17, wherein the apparatus further comprises means for initiating execution of instructions stored in the cache portion by the core processing circuit upon release of the core processing circuit from the reset state.

20. The apparatus of claim 17, wherein the apparatus further comprises means for configuring a shared portion of the memory array to be accessible though the data bus independently of the core processing circuit.

21. An article comprising:

a storage medium comprising machine-readable instructions stored thereon for:

initiating a bus transaction to transmit data to an embedded processing system to set a core processing circuit in a reset state;

initiating a bus transaction to transmit data or instructions in an internal bus of the embedded processing system for storage of instructions in a cache portion of a memory array;

initiating a bus transaction to configure the cache portion to be accessible by the core processing circuit independently of the internal data bus; and initiating a bus transaction to transmit data to the embedded processing system to release the core processing system from the reset state.

* * * * *